United States Patent [19]
Rodriguez

[11] Patent Number: 6,139,199
[45] Date of Patent: Oct. 31, 2000

[54] FAST JUST-IN-TIME (JIT) SCHEDULER

[75] Inventor: John E. Rodriguez, Santa Cruz, Calif.

[73] Assignee: Sun Microsystems, Inc., Palo Alto, Calif.

[21] Appl. No.: 08/877,870

[22] Filed: Jun. 11, 1997

[51] Int. Cl.[7] .................................................. G06F 9/44
[52] U.S. Cl. ........................ 395/709; 395/704; 395/706; 395/390; 395/393; 395/800.23
[58] Field of Search .................................. 395/709, 705, 395/704, 500, 390–395, 568, 570, 580, 581, 583, 588, 800.23, 800.08

[56] References Cited

U.S. PATENT DOCUMENTS

| | | | |
|---|---|---|---|
| 5,704,053 | 12/1997 | Santhanam | 395/383 |
| 5,797,013 | 8/1998 | Mahadevan et al. | 395/709 |
| 5,802,373 | 9/1998 | Yates et al. | 395/705 |

OTHER PUBLICATIONS

Per Bothner, "A Gcc–based Java Implementation," IEEE Compcon '97. Proceedings, pp. 174–178, Feb. 1997.

Cramer et al., "Compiling Java Just in Time," IEEE Micro., vol. 17, Issue 3, pp. 36–43, May–Jun. 1997.

Hsieh et al., "Optimizing NET Compilers for improved Java performance," Computer, vol. 30, Issue 6, pp. 67–75, Jun. 1997.

Cierniak et al., "Briki: an optimizing Java compiler," IEEE Compcon '97. Proceedings, pp. 179–184, Feb. 1997.

Rompaey et al., "Just in Time scheduling," IEEE 1992 International Conference on Computer Design, ICCD '92. Proceedings, pp. 295–300, Oct. 1992.

Dubey et al., "Instruction window size trade–offs and characterization of program parallelism," IEEE Transaction on Computers, vol. 43, Issue 4, pp. 431–442, Apr. 1994.

*Primary Examiner*—Tariq R. Hafiz
*Assistant Examiner*—Tuan Q. Dam
*Attorney, Agent, or Firm*—Skjerven, Morrill, MacPherson, Franklin & Friel LLP; Ken J. Koestner

[57] ABSTRACT

A just-in-time (JIT) compiler typically generates code from bytecodes that have a sequence of assembly instructions forming a "template". It has been discovered that a just-in-time (JIT) compiler generates a small number, approximately 2.3, assembly instructions per bytecode. It has also been discovered that, within a template, the assembly instructions are almost always dependent on the next assembly instruction. The absence of a dependence between instructions of different templates is exploited to increase the size of issue groups using scheduling. A fast method for scheduling program instructions is useful in just-in-time (JIT) compilers. Scheduling of instructions is generally useful for just-in-time (JIT) compilers that are targeted to in-order superscalar processors because the code generated by the JIT compilers is often sequential in nature. The disclosed fast scheduling method has a complexity, and therefore an execution time, that is proportional to the number of instructions in an instruction block (N complexity), a substantial improvement in comparison to the $N^2$ complexity of conventional compiler schedulers. The described fast scheduler advantageously reorders instructions with a single pass, or few passes, through a basic instruction block while a conventional compiler scheduler such as the DAG scheduler must iterate over an instruction basic block many times. A fast scheduler operates using an analysis of a sliding window of three instructions, applying two rules within the three instruction window to determine when to reorder instructions. The analysis includes acquiring the opcodes and operands of each instruction in the three instruction window, and determining register usage and definition of the operands of each instruction with respect to the other instructions within the window. The rules are applied to determine ordering of the instructions within the window.

36 Claims, 7 Drawing Sheets

Template A

Template B

Template A

Template B

FAST JUST-IN-TIME (JIT) SCHEDULER

BACKGROUND OF THE INVENTION

1. Field of the Invention

The present invention relates to compilers for computer systems and processors. More specifically, the present invention relates to code optimizers and schedulers for usage in a just-in-time (JIT) compiler.

2. Description of the Related Art

The Internet is regarded by many as the fastest growing market on Earth. In the 1990s, the number of Internet users has grown exponentially. In June of 1995, an estimated 6.6 million hosts were connected, an increase of nearly 5 million hosts in a mere six months. The current growth rate on the Internet is approximately 75% per year. In June of 1995, the 6.6 million hosts included approximately 120,000 networks and over 27,000 web servers. The number of web servers is doubling approximately every 53 days.

Various technical innovations have proven highly suited to the Internet environment. For example, in 1990 programmers at Sun Microsystems developed a universal programming language, eventually known as "the Java™ programming language". Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.

The Java™ programming language resulted from programming efforts intended for coding in the C++ language. The Java™ programming language thus has many commonalities with C++ but is further regarded as a simple, object-oriented, distributed, interpreted yet high performance, robust yet safe, secure, dynamic, architecturally neutral, portable, and multi-threaded language. The Java™ programming language has emerged as the programming language of choice for the Internet. Many large software and hardware companies have licensed the Java™ programming language from Sun Microsystems.

A highly advantageous characteristic of the Java™ programming language is architectural independence that allows a compiled Java™ program to run on any computer. A Java™ compiler achieves architectural independence by generating an intermediate language that is further converted into multiple highly diverse machine languages that execute in different processors. The intermediate language form used in the Java™ programming language is called a bytecode representation, a set of byte-sized codes representing different commands.

Bytecodes are executed either through usage of a bytecode interpreter or a just-in-time (JIT) compiler. An interpreter is a program that reads bytecodes and executes the operations indicated by the bytecodes. Multiple diverse processors respectively use different interpreters to convert the bytecodes into the particular machine representations that are executable on the processors. Unfortunately, interpretive computer languages are traditionally very slow due to the overhead of executing an intermediate program, the interpreter, in addition to the bytecode execution.

In contrast to interpretation of bytecodes, dynamic or just-in-time (JIT) compilation reads the bytecodes, translates the bytecodes directly into the machine language of the target processor without executing the machine language instructions. Once the bytecodes are compiled, the just-in-time (JIT) compiler terminates and passes control to the machine language version of the bytecode program. The machine language program executes directly on the target processor. The just-in-time (JIT) compiled program executes much faster than a program that is executed in the interpretive environment.

A compiler generally operates in two stages, a code generation stage and an optimization stage. A just-in-time (JIT) compiler, in contrast, typically only includes the code generation stage since any increase in performance gained by optimization is overburdened by the time expended in the optimization process. Some form of scheduling may be useful for just-in-time (JIT) compilers that are used to generate code for in-order superscalar processors, since the code generated by a just-in-time (JIT) compiler has a generally sequential nature. However, the JIT compiler generates code for one bytecode at a time and, due to time constraints, does not reschedule the generated code stream. Ignoring memory stall conditions, typical code streams generated by JIT compilers have an effective scalarity of 1. Accordingly a superscalar processor only executes one instruction at a time, essentially eliminating advantages gained by a superscalar processor over a conventional scalar processor.

Scheduling of instructions is needed to increase the effective usage of superscalar processors by reducing dependences between instructions. Current JIT compilers do not schedule instructions because instruction scheduling is a compile phase that is highly time consuming. A just-in-time (JIT) compiler improves program performance in comparison to performance of an interpreted program only if the compile time of the program is less than timing efficiency improvements achieved in execution of the program.

Traditional compilers employ schedulers such as directed acyclic graph (DAG) schedulers that have a complexity and thus an execution time proportional to the number of instructions squared (an $N^2$ complexity). The time duration of scheduling and thus compiling becomes large for instruction blocks with a large number of instructions.

What is needed is a fast technique for scheduling that improves the overall performance of a program executing in a just-in-time (JIT) compiler environment.

SUMMARY OF THE INVENTION

A just-in-time (JIT) compiler typically generates code from bytecodes that have a sequence of assembly instructions forming a "template". It has been discovered that a just-in-time (JIT) compiler generates as small number, approximately 2.3, assembly instructions per bytecode. It has also been discovered that, within a template, the assembly instructions are almost always dependent on the next assembly instruction. The absence of a dependence between instructions of different templates is exploited to increase the size of issue groups using scheduling.

In accordance with an embodiment of the present invention, a fast method for scheduling program instructions is particularly advantageous for usage in just-in-time (JIT) compilers. Scheduling of instructions is generally useful for just-in-time (JIT) compilers that are targeted to in-order superscalar processors because the code generated by the JIT compilers is often sequential in nature. The disclosed fast scheduling method has a complexity, and therefore an execution time, that is proportional to the number of instructions in an instruction block (N complexity), a substantial improvement in comparison to the $N^2$ complexity of conventional compilers. The described fast scheduler advantageously reorders instructions with a single pass, or few passes, through a basic instruction block while a conventional compiler scheduler such as the DAG scheduler must iterate over an instruction basic block many times.

In accordance with an embodiment of the present invention, a fast scheduler operates using an analysis of a sliding window of three instructions, applying two rules within the three instruction window to determine when to reorder instructions. The analysis includes acquiring the opcodes and operands of each instruction in the three instruction window, and determining register usage and definition of the operands of each instruction with respect to the other instructions within the window. The rules are applied to determine ordering of the instructions within the window.

In accordance with an embodiment of the present invention, a method of scheduling instructions for usage in a compiler includes defining a first instruction pointer, a second instruction pointer, and a third instruction pointer designating a sliding three instruction window and identifying a first instruction, a second instruction, and a third instruction as a consecutive sequence of instructions. The method also includes determining, in the sliding instruction window, whether the second instruction is dependent on the first instruction and whether the third instruction is dependent on the second instruction. The method further includes switching the second instruction and the third instruction when the second instruction is dependent on the first instruction and the third instruction is not dependent on the second instruction, incrementing by two the first instruction pointer, the second instruction pointer, and the third instruction pointer if the second and third instructions are switched in the switching operation, and incrementing by one the first instruction pointer, the second instruction pointer, and the third instruction pointer otherwise.

In accordance with a further embodiment of the present invention, method of scheduling instructions for execution in a superscalar processor includes acquiring a sliding window including three consecutive instructions, analyzing the sliding window of three instructions, and applying a plurality of rules to the three instructions within the sliding window to determine when to reorder the instructions within the sliding window.

Many advantages are achieved by the described fast scheduler and operating method. The fast scheduler advantageously performs a scheduling optimization using a very fast operation in which very few calculations are performed per instruction in a single loop, or very few loops, through the instructions. The analysis of the three consecutive instructions in two successive examination operations is advantageously much faster than conventional scheduling techniques involving iteration of dataflow equations.

It is advantageous that the fast scheduler is very simple. The simplicity of the fast scheduler is highly advantageous in reducing the amount of time expended in just-in-time (JIT) compiling.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

DETAILED DESCRIPTION OF THE ILLUSTRATIVE EMBODIMENTS

Figure 1:
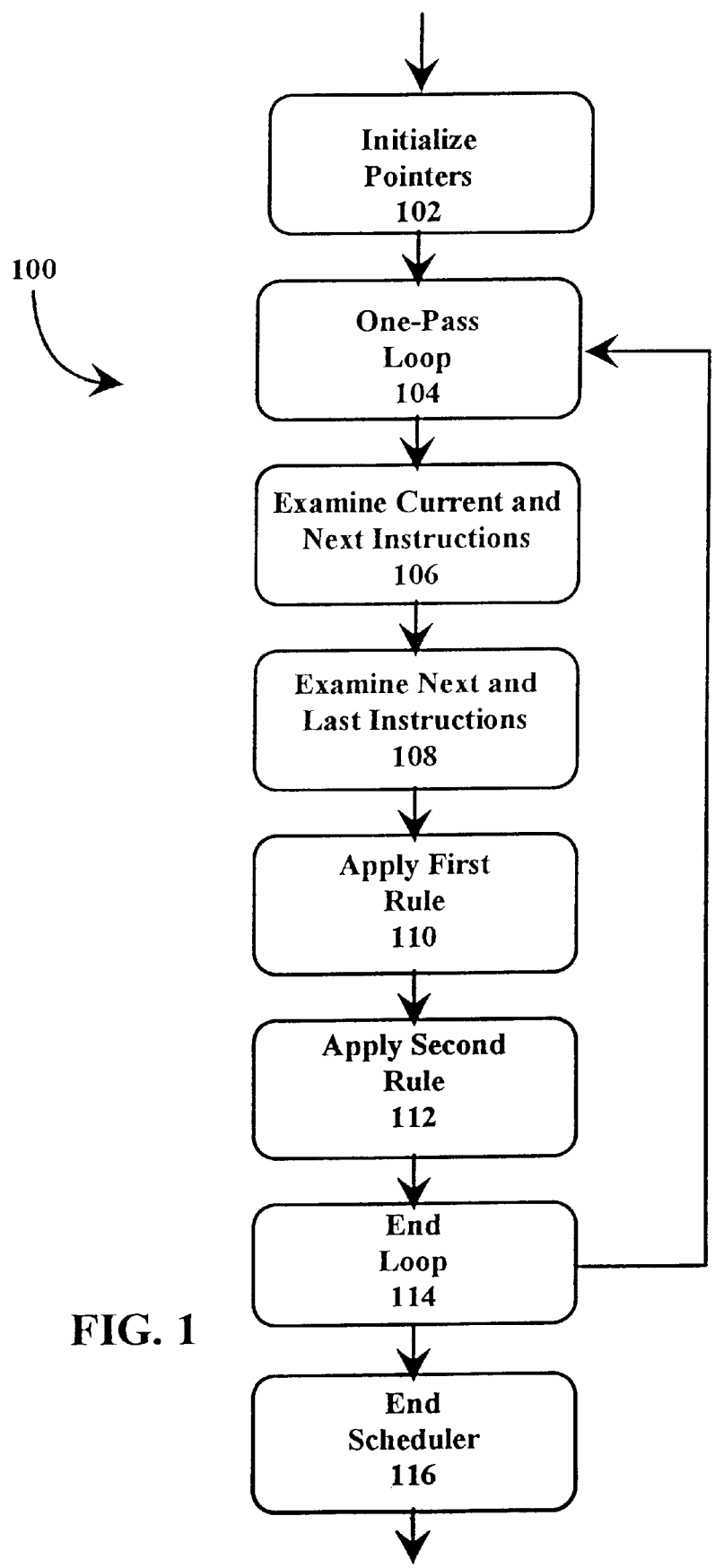
FIG. 1 is a flowchart illustrating an embodiment of a one-pass fast instruction scheduling technique for reordering program instructions to avoid register definition/use dependences.

Referring to FIG. 1, a flowchart illustrates an embodiment of a one-pass fast instruction scheduling technique 100 for reordering program instructions to avoid register definition/ use dependences. The fast instruction scheduling technique 100 operates using a sliding window of three instructions, applying two rules to the instructions in the sliding window to determine when to reorder the instructions. In an initialize pointers operation 102, a current (first) instruction pointer, a next (second) instruction pointer, and a last (third) instruction pointer are set to initial values defining a three instruction window. The instructions in the window are sequential so that the relative offsets among the initialized pointers are 0, 1, and 2 for the current, next, and last instructions, respectively. For example, if instructions are all consecutive four-byte instructions, the next and last instruction pointers have addresses four and eight counts greater than the count of the current instruction pointer. In a one-pass loop operation 104, the fast instruction scheduling technique 100 passes through all instructions to be scheduled in a single-pass loop. In the loop an analysis is performed for the three instruction window that determines whether an instruction defines a register that is used in the next sequential instruction. First, an examine current and next instructions operation 106 determines whether the instruction designated by the current instruction pointer defines a register that is used in the instruction designated by the next instruction pointer. Second, an examine next and last instructions operation 108 determines whether the instruction designated by the next instruction pointer defines a register that is used in the instruction designated by the last instruction pointer. The determination of register definition and usage dependences thus involves only the examination of two consecutive instructions at a time, first the current and next instruction pairs and second the next and last instruction pairs. Advantageously, the analysis of the three consecutive instructions in two successive examination operations is much faster than conventional scheduling techniques involving iteration of dataflow equations.

The instructions are potentially reordered using an apply first rule operation 110 and an apply second rule operation 112. In the first rule 110, if the current instruction defines a register that is used by the next instruction and the next instruction does not define a register that is used in the last equation, then the next instruction is switched with the last instruction. In the second rule 112, if the next instruction and the last instruction were switched in the apply first rule operation 110, then the current, next, and last instruction pointers are incremented by two instructions. Otherwise, the current, next, and last instruction pointers are incremented by one instruction.

An end loop operation 114 loops to the one-pass loop operation 104 if more instructions remain for scheduling. If all instructions have been scheduled, an end scheduler operation 116 terminates the fast instruction scheduling technique 100.

Operation of the fast instruction scheduling technique 100 is illustrated by an example in which SPARC assembler instructions are reordered to improve superscalar execution. A list of SPARC instructions, as follows, depicts a plurality of four-byte instructions. An address field designates a physical address of the operations, the instruction and operands designates the particular instruction to be executed and the operands operated upon by the instruction. The operands are ordered in a typical order of source 1 operand, source 2 operand, and destination operand for three-operand instructions and ordered in a typical order of source operand and destination operand. Register operands are labeled using a percent (%) sign followed by a letter designating a register type of the types in (%i), out (%o), local (%l), and general purpose (%g), and a numeral designating the register number. A Group field designates grouping of instructions for execution by a superscalar processor that executes multiple instructions in a single cycle. In the illustrative example, the superscalar processor is capable of executing two instructions in a single cycle so long as no dependences, such as register dependences, occurs.

| Address  | Instruction | Operands          | Group |
|----------|-------------|-------------------|-------|
| (23b8c8) | add         | % i5, 1, % i5     | 0     |
| (23b8cc) | sub         | % i5, 1, % 10     | 1     |
| (23b8d0) | ld          | [% i2 + 4], % 12  | 2     |
| (23b8d4) | srl         | % 12, 5, % 12     | 3     |
| (23b8d8) | subcc       | % 10, % 12, % g0  | 4     |
| (23b8dc) | tcc         | % g0, 5           | 5     |
| (23b8e0) | ld          | [% i2 + 0], % 11  | 6     |
| (23b8e4) | sll         | % 10, 2, % g1     | 6     |
| (23b8e8) | st          | % i3, [% 11 + % g1] | 7   |

In this example, the add instruction at address (23b8c8) defines register %i5, which is used in the sub instruction at address (23b8cc) so that a register dependence (register %i5) prevents concurrent execution so that the add instruction is executed in group 0 and the sub instruction is executed in group 1. Similarly, a register dependence of register %12 prevents combination of the 1d instruction at address (23b8d0) and the srl instruction at address (23b8d4). A trap instruction, such as the trap on carry clear instruction (tcc) at address (23b8dc), is constrained to always issue alone. Only the 1d instruction at address (23b8e0) and the sll instruction at address (23b8e4) do not have a register dependence so that the instructions are combined in group 6.

To begin the fast instruction scheduling technique 100, the initialize pointers operation 102 sets the current instruction pointer to the value (23b8c8), the next instruction pointer to the value (23b8d0), and the last instruction pointer to the value (23b8d4). A mark routine extracts the opcodes and registers of the instructions and examines the instructions.

The first analysis in the one-pass loop operation 104 is performed on the instructions, as follows:

| mark (current, next, last) | | | |
|---|---|---|---|
| current | (23b8c8) | add | % i5, 1, % i5 |
| next | (23b8cc) | sub | % i5, 1, % 10 |
| last | (23b8d0) | ld | [% i2 + 4], % 12 |

The register designations shown in bold indicate a register that is defined in one instruction and used in a next successive register, a potential register dependence. The examine current and next instructions operation 106 determines that the current instruction does define a register, %i5, that is used in the next instruction. The examine next and last instructions operation 108 determines that the next instruction does not define a register that is used in the last operation. The apply first rule operation 110 determines that rule 1 is satisfied so that the next instruction and the last instruction are switched. The apply second rule operation 112 determines that a switch is performed in the application of rule 1 so that the current instruction pointer, the next instruction pointer, and the last instruction pointer are incremented by two, resulting in the reordered sequence of instructions as follows:

| mark (current, next, last) | | | |
|---|---|---|---|
| | (23b8c8) | add | % i5, 1, % i5 |
| | (23b8d0) | ld | [% i2 + 4], % 12 |
| current | (23b8cc) | sub | % i5, 1, % 10 |
| next | (23b8d4) | srl | % 12, 5, % 12 |
| last | (23b8d8) | subcc | % 10, % 12, % g0 |

The examine current and next instructions operation 106 determines that the current instruction does not define a register that is used in the next instruction. The examine next and last instructions operation 108 determines that the next instruction does define a register that is used in the last operation. The apply first rule operation 110 determines that rule 1 is not satisfied so that no instructions are switched. The apply second rule operation 112 determines that a switch is not performed in the application of rule 1 so that the current instruction pointer, the next instruction pointer, and the last instruction pointer are incremented by one, resulting in the reordered sequence of instructions as follows:

| mark (current, next, last) | | | |
|---|---|---|---|
| | (23b8c8) | add | % i5, 1, % i5 |
| | (23b8d0) | ld | [% i2 + 4], % 12 |
| | (23b8cc) | sub | % i5, 1, % 10 |
| current | (23b8d4) | srl | % 12, 5, % 12 |
| next | (23b8d8) | subcc | % 10, % 12, % g0 |
| last | (23b8dc) | tcc | % g0, 5 |

The examine current and next instructions operation 106 determines that the current instruction does define a register, % 12, that is used in the next instruction. However, the examine next and last instructions operation 108 determines that the next instruction also defines a register that is used in the last operation. The apply first rule operation 110 determines that rule 1 is not satisfied so that no instructions are switched. The apply second rule operation 112 determines that a switch is not performed in the application of rule 1 so that the current instruction pointer, the next instruction pointer, and the last instruction pointer are incremented by one, resulting in the reordered sequence of instructions as follows:

|  | mark (current, next, last) |  |  |
|---|---|---|---|
|  | (23b8c8) | add | % i5, 1, % i5 |
|  | (23b8d0) | ld | [% i2 + 4], % l2 |
|  | (23b8cc) | sub | % i5, 1, % l0 |
|  | (23b8d4) | srl | % l2, 5, % l2 |
| current | (23b8d8) | subcc | % l0, % l2, % g0 |
| next | (23b8dc) | tcc | % g0, 5 |
| last | (23b8e0) | ld | [% i2 + 0], % l1 |

The examine current and next instructions operation 106 determines that the current instruction does define a register, %g0, that is used in the next instruction. The examine next and last instructions operation 108 determines that the next instruction does not define a register that is used in the last operation. The apply first rule operation 110 determines that rule 1 is satisfied so that the next instruction and the last instruction are switched. The apply second rule operation 112 determines that a switch is performed in the application of rule 1 so that the current instruction pointer, the next instruction pointer, and the last instruction pointer are incremented by two, resulting in the reordered sequence of instructions as follows:

|  | mark (current, next, last) |  |  |
|---|---|---|---|
|  | (23b8c8) | add | % i5, 1, % i5 |
|  | (23b8d0) | ld | [% i2 + 4], % l2 |
|  | (23b8cc) | sub | % i5, 1, % l0 |
|  | (23b8d4) | srl | % l2, 5, % l2 |
|  | (23b8d8) | subcc | % l0, % l2, % g0 |
|  | (23b8e0) | ld | [% i2 + 0], % l1 |
| current | (23b8dc) | tcc | % g0, 5 |
| next | (23b8e4) | sll | % l0, 2, % g1 |
| last | (23b8e8) | st | % i3, [% l1 + % g1] |

The examine current and next instructions operation 106 determines that the current instruction does not define a register that is used in the next instruction. The examine next and last instructions operation 108 determines that the next instruction does not define a register that is used in the last operation. The apply first rule operation 110 determines that neither test of rule 1 is satisfied so that no instructions are switched. All instructions have been scheduled so the end scheduler operation 116 terminates the fast instruction scheduling technique 100, leaving the scheduled instructions in the order as follows:

| Address | Instruction | Operands | Group |
|---|---|---|---|
| (23b8c8) | add | % i5, 1 % l5 | 0 |
| (23b8d0) | ld | [% i2 + 4], % l2 | 0 |
| (23b8cc) | sub | % i5, 1, % l0 | 1 |
| (23b8d4) | srl | % l2, 5, % l2 | 1 |
| (23b8d8) | subcc | % l0, % l2, % g0 | 2 |
| (23b8e0) | ld | [% i2 + 0], % l1 | 2 |
| (23b8dc) | tcc | % g0, 5 | 3 |
| (23b8e4) | sll | % l0, 2, % g1 | 4 |
| (23b8e8) | st | % i3, [% l1 + % g1] | 5 |

Two instructions are switched by passing through the basic block of instructions, causing the instruction issue groups to change from seven groups to five groups. Using the fast instruction scheduling technique 100, an optimal schedule is produced. The resulting schedule is not improved through the usage of more complex, slower, but more powerful schedulers.

A pseudocode routine for a first embodiment of the fast instruction scheduling technique 100 is described as follows:

```
// A mark routine extracts the opcodes and registers of the instructions and examines
// the instructions.
  mark(cur, next, last)
// Cur, next, and last are pointers to data variables having an unsigned data type.
//   The data variables represent processor instructions, such as SPARC
//   instructions.
// D designates a register that is defined in an instruction and used in a next
//   successive instruction, !D is the inverse of D, designating that an instruction
//   does not define a register that is used in the next successive instruction.
  get the destination register designated by the cur pointer
  get the destination register and the source registers designated by the next pointer
  get the source registers designated by the last pointer
  get opcodes for the three instructions designated by the cur, next, and last
  pointers
  set status D or !D for instructions designated by the cur and next pointers
  set status D or !D for instructions designated by the next and last pointers
//
//
// A main loop moves through the basic instruction block.
// Cur, next, and last are pointers to instruction fields that point to the appropriate area
//   in memory for selected instructions.
  while (!blockBoundary) {
        mark(cur, next, last)
        if(cur.dep=='D' && next.dep=='!D') then switch next and last instructions
        if(switched)
        then {increment cur.instr, next.instr and last.instr by 2}
        else {increment cur.instr, next.instr and last.instr by 1}
  }
```

```
fixup TrapPatches( )
//
//
```

In an alternative embodiment, efficiencies may be gained by reducing the number of register and opcode extraction operations. Operation reduction is achieved through usage of a single pointer identifying the position of a three instruction window rather than three pointers individually designating three instructions. An initial operation of a loop extracts registers and opcodes for three instructions representing the current, next, and last instructions. In subsequent instructions, the three instruction window slides through the instructions so that the window pointer accesses the instruction corresponding the last instruction, while the current instruction corresponds to the next instruction of the previous determination and the next instruction corresponds to the last instruction of the previous determination when the window pointer is incremented by one. If the window pointer is incremented by two, the next and last instructions are extracted while the current instruction corresponds to the last instruction of the previous determination. A pseudocode routine for a second embodiment of the fast instruction scheduling technique 100 is described as follows:

```
//
initialize window pointer to the first window in an instruction block
get the instruction designated by the window pointer
save the instruction as a current.instruction storage
get the instruction designated by the window pointer + 1 instruction
save the instruction as a next.instruction storage
get the instruction designated by the window pointer + 2 instructions
save the instruction as a last.instruction storage
while (!blockBoundary) {
    set status D or !D for instructions designated by the cur and next
        pointers (cur.dep)
    set status D or !D for instructions designated by the next and last
        pointers (next.dep)
    if(cur.dep=='D' && next.dep=='!D') then switch next and last
    instructions
    if(switched) then
        increment window pointer by 2
        copy last.instruction storage to current.instruction storage
        get the instruction designated by the window pointer + 1
        instruction
        save the instruction as a next.instruction storage
        get the instruction designated by the window pointer + 2
        instructions
        save the instruction as a last.instruction storage
    else
        increment window pointer by 1
        copy next.instruction storage to current.instruction storage
        copy last.instruction storage to next.instruction storage
    endif
    get the instruction designated by the window pointer + 2
    instructions
    save the instruction as a last.instruction storage
}
fixup TrapPatches( )
//
//
```

Figure 2:
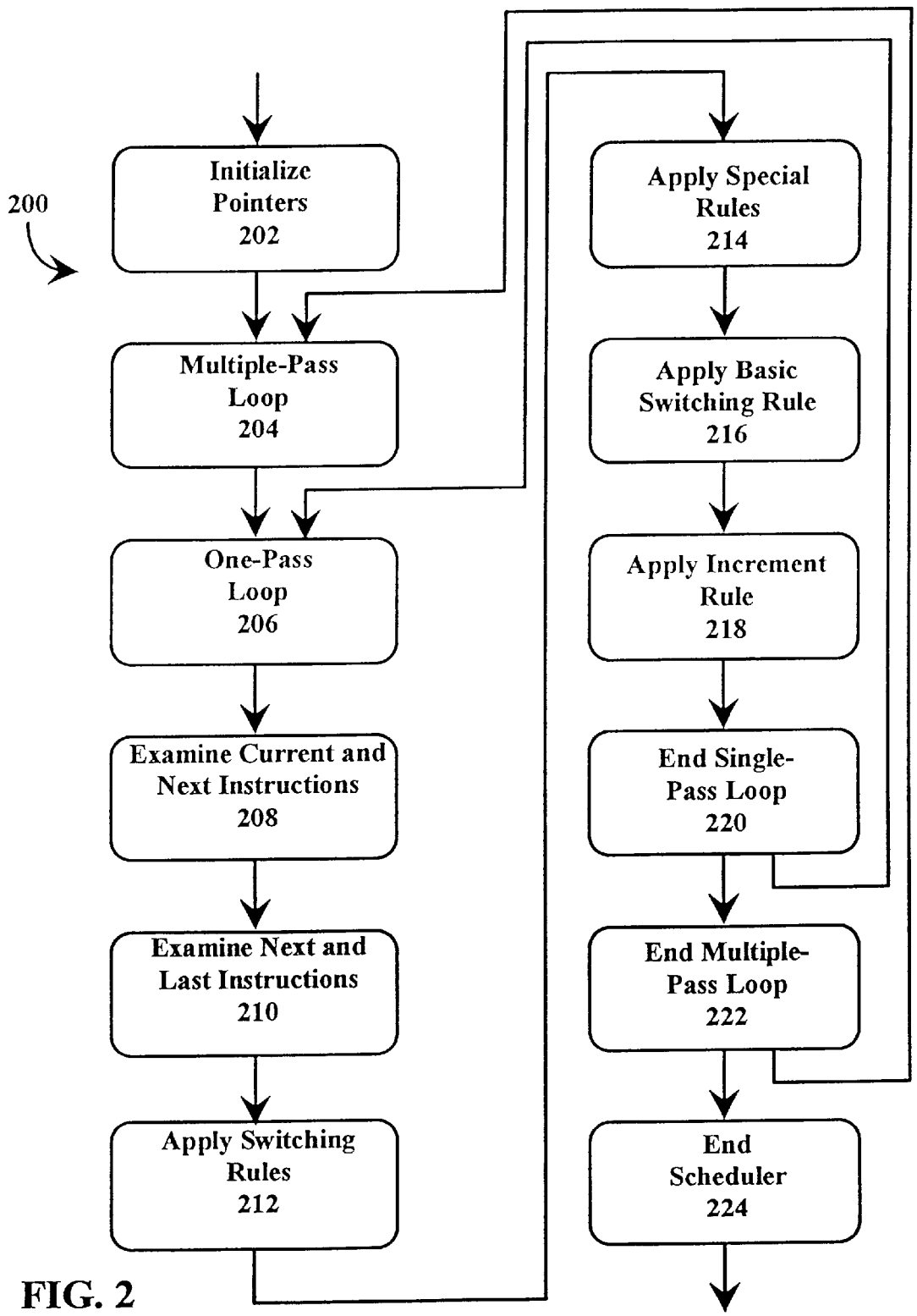
FIG. 2 is a flowchart illustrating an embodiment of a multiple-pass fast instruction scheduling technique which reorders program instructions in a plurality of iterations to address register definition/use dependences.

Referring to FIG. 2, a flowchart illustrates an embodiment of a multiple-pass fast instruction scheduling technique 200 which reorders program instructions in a plurality of iterations to address register definition/use dependences. More optimal instruction schedules may be generated by iterating through the basic instruction blocks in multiple passes. The advantage gained by the improvement in scheduling is generally tempered by the increased time used in multiple pass iterations.

Pseudocode, as follows, illustrates a technique for multiple-pass scheduling:

```
//iterate through the scheduling operation up to ten times so long as
//   changes continue to occur
while (changes&&iterations<10)
{
    fastSched( );  // apply rules for switching to a basic instruction
                   //   block per iteration.
}
```

In the multiple-pass fast instruction scheduling technique 200, a fast scheduling iteration is performed multiple times so that instructions that are switched rise within a basic instruction block, enabling additional opportunities for switching in subsequent passes. The rise in instructions resulting from multiple passes of the fast scheduler approximates the result achieved by optimization techniques of traditional compiler schedulers.

Like the single-pass fast instruction scheduling technique 100, the multiple-pass fast instruction scheduling technique 200 uses a sliding window of three instructions to determine when to reorder the instructions, but uses a set of rules that are a modified version of the first and second rules described in the discussion of FIG. 1. The modified rules include a set of switching rules 212 and an increment rule 218. In an initialize pointers operation 202, a current instruction pointer, a next instruction pointer, and a last instruction pointer are set to initial values defining a sequential three instruction window with relative offsets among the initialized pointers of 0, 1, and 2. In a multiple-pass loop operation 204, the multiple-pass fast instruction scheduling technique 200 repeats for a selected number of loops through an instruction block. Nested within the multiple-pass loop operation 204 is a single-pass loop operation 206 which passes through all instructions to be scheduled in a single-pass loop. In the single-pass loop operation 206, an analysis is performed for the three instruction window that determines whether an instruction defines a register that is used in the next sequential instruction. First, an examine current and next instructions operation 208 determines whether the instruction designated by the current instruction pointer defines a register that is used in the instruction designated by the next instruction pointer. Second, an examine next and last instructions operation 210 determines whether the instruction designated by the next instruction pointer defines a register that is used in the instruction designated by the last instruction pointer.

The instructions are potentially reordered using an apply switching rule operation 212 and an apply increment rule operation 218. The apply switching rule operation 218 includes two alternative rules, a set of special rules 214 and a basic switching rule 216 that applies when the special rules 214 are not used. The basic switching rule 216 is the same as the first rule 110 applied in the single-pass fast instruction scheduling technique 100, if the current instruction defines a register that is used by the next instruction and the next instruction does not define a register that is used in the last equation, then the next instruction is switched with the last instruction.

In the increment rule 218, if the next instruction and the last instruction were switched in the apply switching rules operation 212, then the current, next, and last instruction pointers are incremented by two instructions. Otherwise, the current, next, and last instruction pointers are incremented by one instruction.

An end single-pass loop operation 220 loops to the single-pass loop operation 206 if more instructions remain for scheduling. If all instructions have been scheduled, and additional passes of the multiple passes are selected, an end multiple-pass loop operation 222 loops to the multiple-pass loop operation 204. If all of the multiple passes are complete, an end scheduler operation 224 terminates the multiple-pass fast instruction scheduling technique 200.

Figure 3:
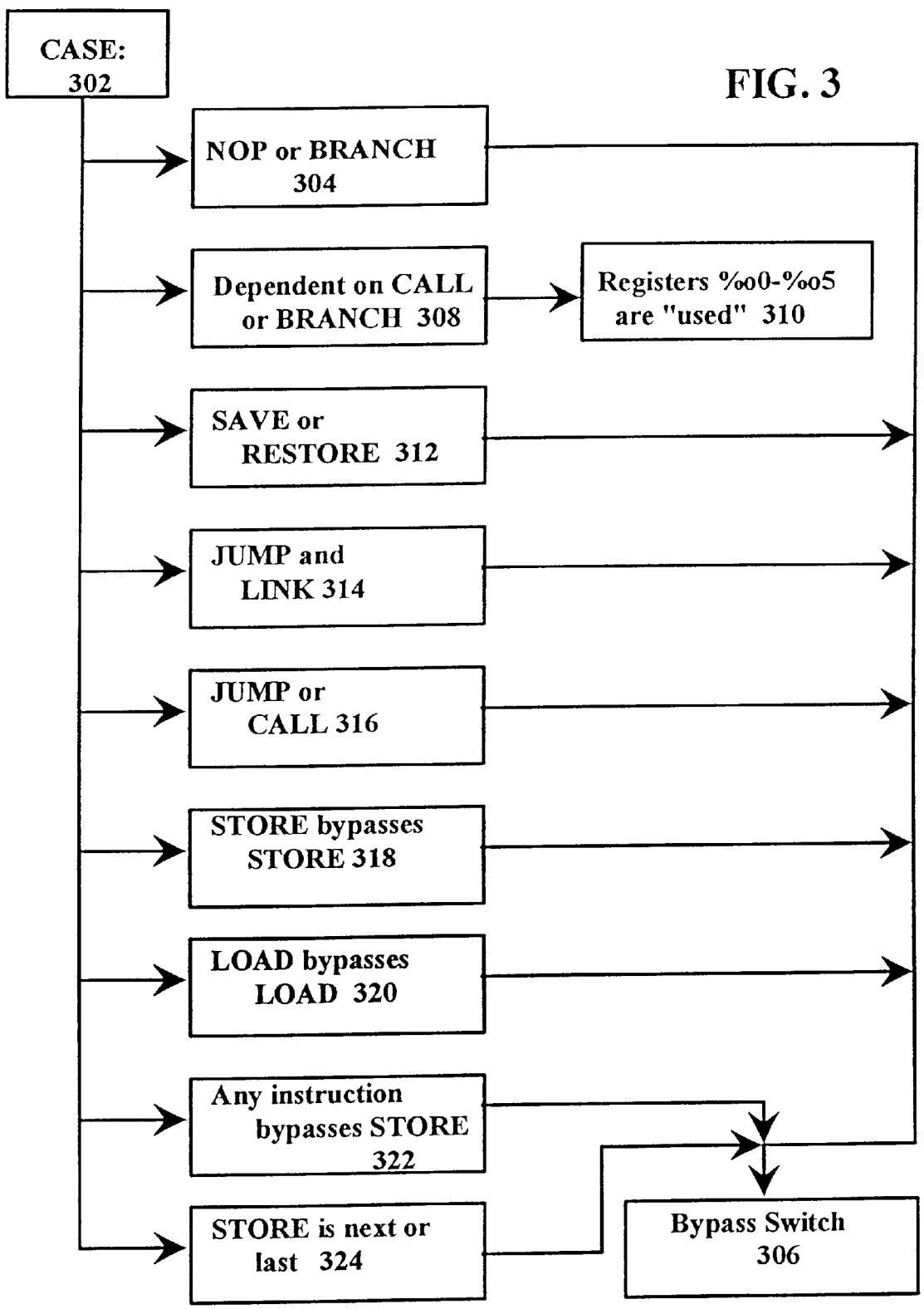
FIG. 3 is a flowchart illustrating an embodiment of a special rules operation which is suitable for usage in the multiple-pass fast instruction scheduling technique depicted in FIG. 2.

Referring to FIG. 3, a flowchart illustrates an embodiment of a special rules 214 operation which is suitable for usage in the multiple-pass fast instruction scheduling technique 200 depicted in FIG. 2. Some of the rules apply to load/store bypassing that, when unconstrained, may result in aliasing problems.

In the illustrative embodiment, the flowchart for the special rules 214 implements a case statement 302. In a first case, specifically in case of a 'nop' or 'branch' instruction 304, an override switch operation 306 prevents switching of instructions that should not be switched to preserve semantic consistency of instructions in a particular processor implementation. Some special rules are invoked to account for hardware-specific operational details of a particular processor. In some embodiments, a switch is prevented by setting the dependence status to "not dependent" (!D) for both the current instructions (cur.dep) designated by the cur and next pointers, and the next instructions (next.dep) designated by the next and last pointers.

In a second case, specifically the case of register dependences on particular branch or CALL type instructions 308, out registers %o0–%o5 are presumed to be used registers in the current instruction designated by the car pointer and the next instruction designated by the next pointer 310.

In a third case, an instruction switch is overridden or prevented when a SAVE instruction or a RESTORE instruction is in the position of the next instruction designated by the next pointer or the last instruction designated by the last pointer 312.

In a fourth case, an instruction switch is overridden or prevented when a jump and link (JMPL) instruction is in the position of either the current instruction designated by the cur pointer or the next instruction designated by the next pointer 314.

In a fifth case, an instruction switch is overridden or prevented when a JUMP instruction or a CALL instruction is in the position of either the current instruction designated by the cur pointer or the next instruction designated by the next pointer 316.

In a sixth case, a switch is overridden or prevented that would bypass a STORE instruction with another STORE instruction 318.

In a seventh case, a switch is overridden or prevented that would bypass a LOAD instruction with another LOAD instruction 320.

In an eighth case, a switch is overridden or prevented that would bypass any instruction with a STORE instruction 322.

In a ninth case, an instruction switch is overridden or prevented when a STORE instruction is in the position of either the next instruction designated by the next pointer or the last instruction designated by the last pointer 324.

Other special rules may be implemented to improve the performance of an in-order superscalar processor depending on the implementation of the instructions by the processor. Different rules may be applicable for different processors.

Figure 4A:
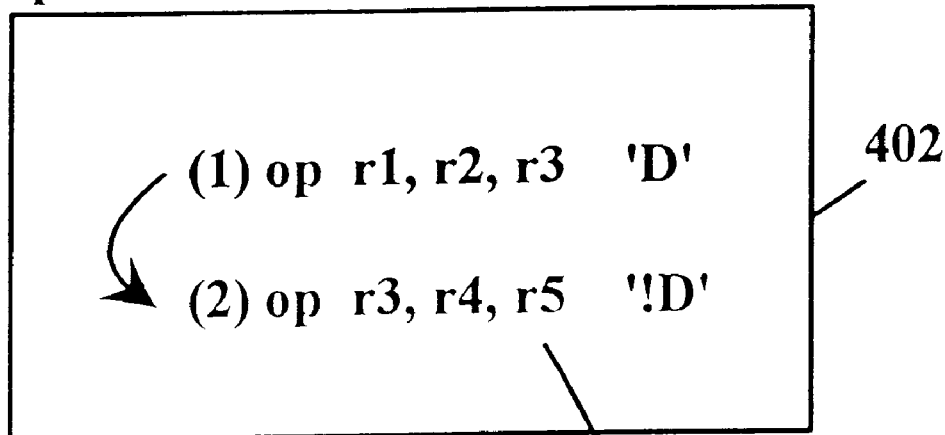
FIGS. 4A and 4B are pictorial views showing a template A and a template B prior to reordering, and the template A and the template B after reordering, thereby illustrating a theoretical basis for the illustrative scheduling technique.
Figure 4A:
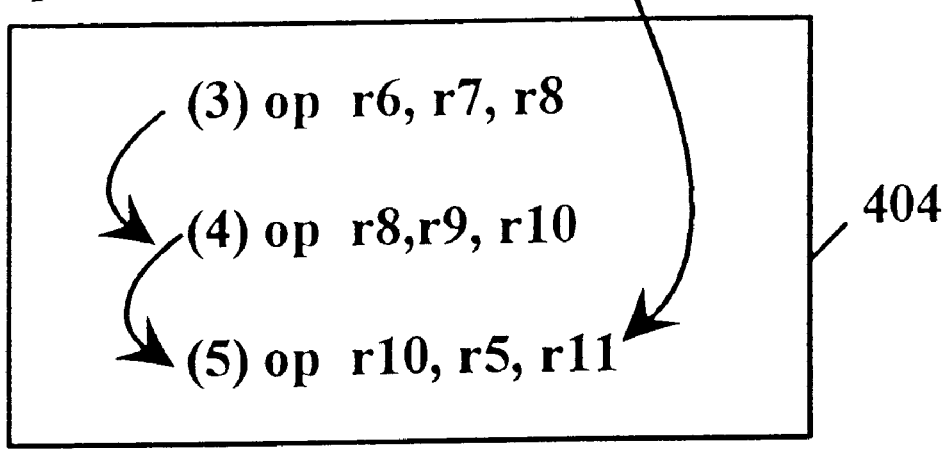
Figure 4B:
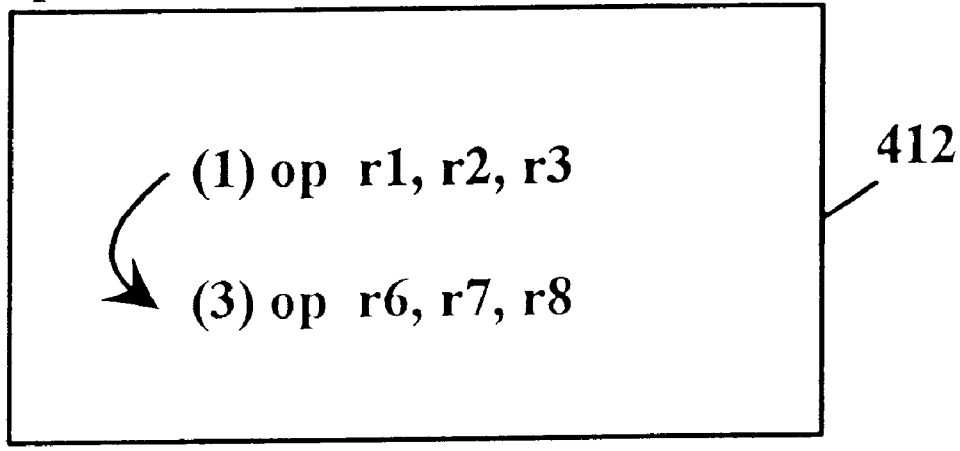
Figure 4B:
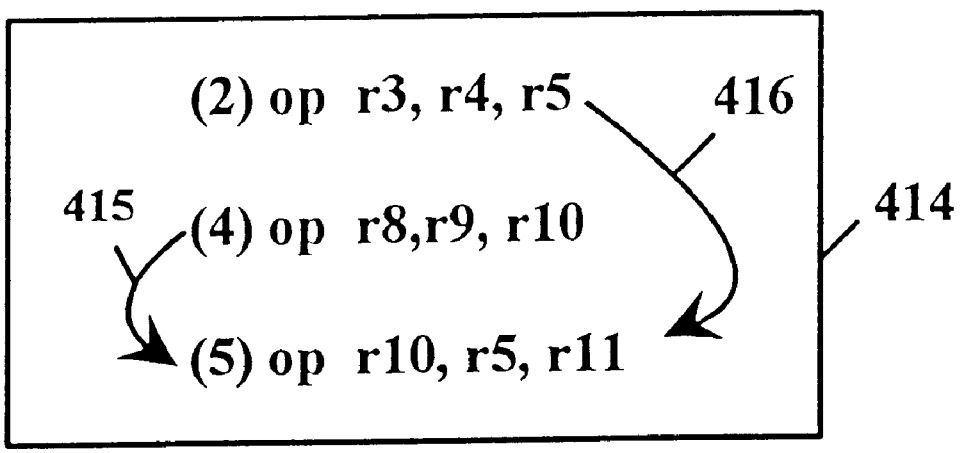

Referring to FIGS. 4A and 4B, pictorial views of a template A 402 and a template B 404 prior to reordering, and the template A 412 and the template B 414 after reordering, illustrate a theoretical basis for the illustrative scheduling technique. The scheduler exploits several aspects of code generation and bytecode characteristics. The just-in-time (JIT) compiler, like traditional (non-JIT) compilers, generates code using a template technique. In the case of a just-in-time (JIT) compiler, each bytecode has a sequence of assembly instructions that, in combination, form a "template". A typical just-in-time (JIT) compiler generates approximately 2.3 assembly instructions per bytecode. Within a template, the assembly instructions are almost always dependent on the next assembly instruction, a dependence that is illustrated by the lines 405, 406, 407, and 408 in FIG. 4A. Due to the dependences between instructions, the instructions are issued in four issue groups including a first group containing instruction [1] alone, a second group containing instructions [2] and [3], a third group containing instruction [4], and a fourth group containing instruction [5] alone.

The scheduling technique illustrated in FIGS. 1, 2, and 3 is employed to transform the templates to the template A 412 and the template B 414 shown in FIG. 4B. Dependence is depicted by lines 415 and 416. The transformation is accomplished by switching instructions [2] and [3] using the prescribed reordering rules. Following scheduling, the instructions are issued in three groups including a first group containing instructions [1] and [3], a second group containing instructions [2] and [4], and a third group containing instruction [5] alone. The reduction in issue groups from four groups to three groups is a significant accomplishment in a single pass through a basic instruction block.

However, from one template to the next template, for example from template A 402 to template B 404, a dependence may or may not occur. The absence of a dependence between instructions of different templates is exploited to increase the size of issue groups using scheduling.

Figure 5:
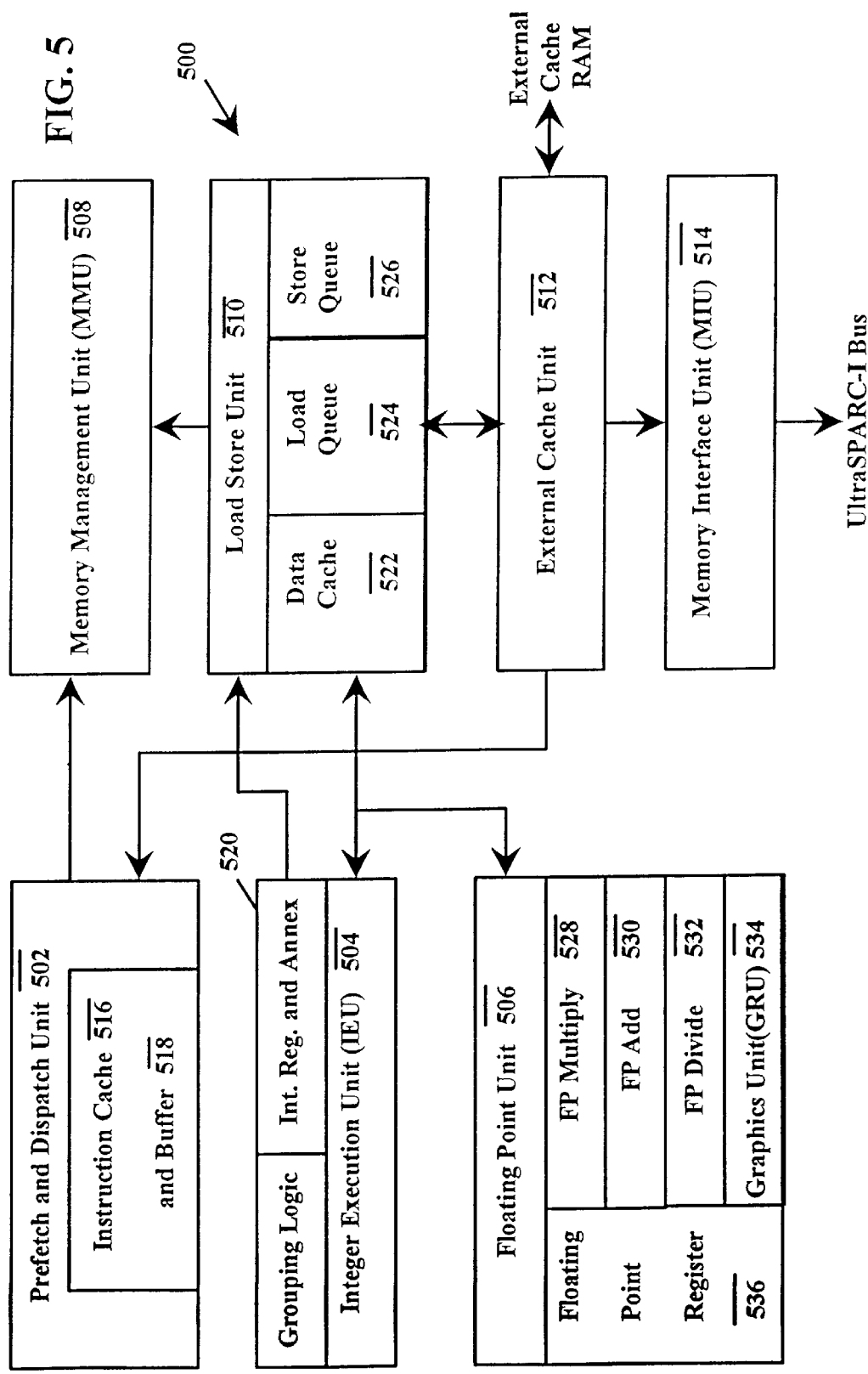
FIG. 5 is a schematic block diagram showing a suitable target processor for operating using instructions compiled using a just-in-time (JIT) compiler.

Referring to FIG. 5, a schematic block diagram illustrates one example of a suitable target processor 500 for operating using instructions compiled using a just-in-time (JIT) compiler. A variety of other target processors may be used. The processor 500 includes a prefetch and dispatch unit 502, an integer execution unit 504, a floating point unit 506, a memory management unit 508, a load store unit 510, an external cache unit 512, and a memory interface unit 514. The prefetch and dispatch unit 502 fetches instructions into a pipeline (not shown) before the instructions are needed, assuring that all execution units are busy. The prefetch and dispatch unit 502 fetches instructions from all levels of a memory hierarchy including an instruction cache 516, an external cache (not shown) and a main memory (not shown). The prefetch and dispatch unit 502 includes the instruction cache 516 and a prefetch buffer 518 that decouples instruction prefetching from instruction dispatch, thereby preventing pipeline stalls. The prefetch and dispatch unit 502 also includes support for dynamic branch prediction to allow the processor 500 to prefetch instructions and prepare the instructions for execution by various instruction execution units.

The integer execution unit 504 includes multiple arithmetic logic units (ALUs) for executing arithmetic, logical, and shift operations. The integer execution unit 504 also includes a multiple-window register file 520 for accessing data during computational execution of instructions. The integer execution unit 504 operates in conjunction with the load store unit 510 for accessing data, executing arithmetic, logical, and shift operations on the data, and storing the calculated data into storage. When a load operation is issued, the integer execution unit 504 address operands from the register file 520. If the operands are contained in the pipeline, a read of the register file 520 is bypassed and data is accessed from the internal pipeline. Once the address operands are obtained, the address operands are added to obtain the memory address of a sought item. The calculated address is registered in the integer execution unit 504 and written to the register file 520. When a store operation is issued, the integer execution unit 504 reads the sought operands from the register file 520. A register read may be bypassed if sought operands are contained in the pipeline. Once the operands are obtained, the store operand register physical address is computed to determine the virtual address of a store operation. The store data is registered by a data cache 522 and written.

The load store unit 510 includes the data cache 522, a load queue 524, and a store queue 526.

The floating point unit 506 is a pipelined floating point processor that includes five separate functional units, specifically a floating point multiply unit 528, a floating point add unit 530, a floating point divide unit 532, a graphics unit 534. The separate function units allow the processor 500 to execute multiple floating point instructions per cycle. Source and data results are stored in a 32-entry register file 536.

The memory management unit 508 handles memory operations and arbitrates between data stores and memory. The memory management unit 508 implements virtual memory and translates virtual addresses of each running process to physical addresses in memory. The memory management unit 508 supports memory protection to prohibit a process from reading or writing the address space of another process.

The memory interface unit 514 is an input/output subsystem that controls input and output transfers between local resources including the processor 500, main memory, control space, and external system resources. In particular, the memory interface unit 514 manages all transactions to a system including external cache misses, interrupts, snoops, and writebacks.

The external cache unit 512 manages instruction and data cache misses. High-performance microprocessors use caches to reduce bus traffic and increase system throughput. Cache stores contain copies of part of a memory image. A choice of updating or invalidating copies of modified blocks is made according to a cache consistency protocol, ensuring that copies of data in the cache remain consistent with copies in main memory. The data cache 522 is a direct-mapped, software selectable write-through non-allocating cache that is used on load and store accesses from the processor 500 to cacheable pages of main memory. The instruction cache 516 is a two-way set-associative cache used on instruction fetch accesses from the processor 500 to cacheable pages of main memory.

Figure 6:
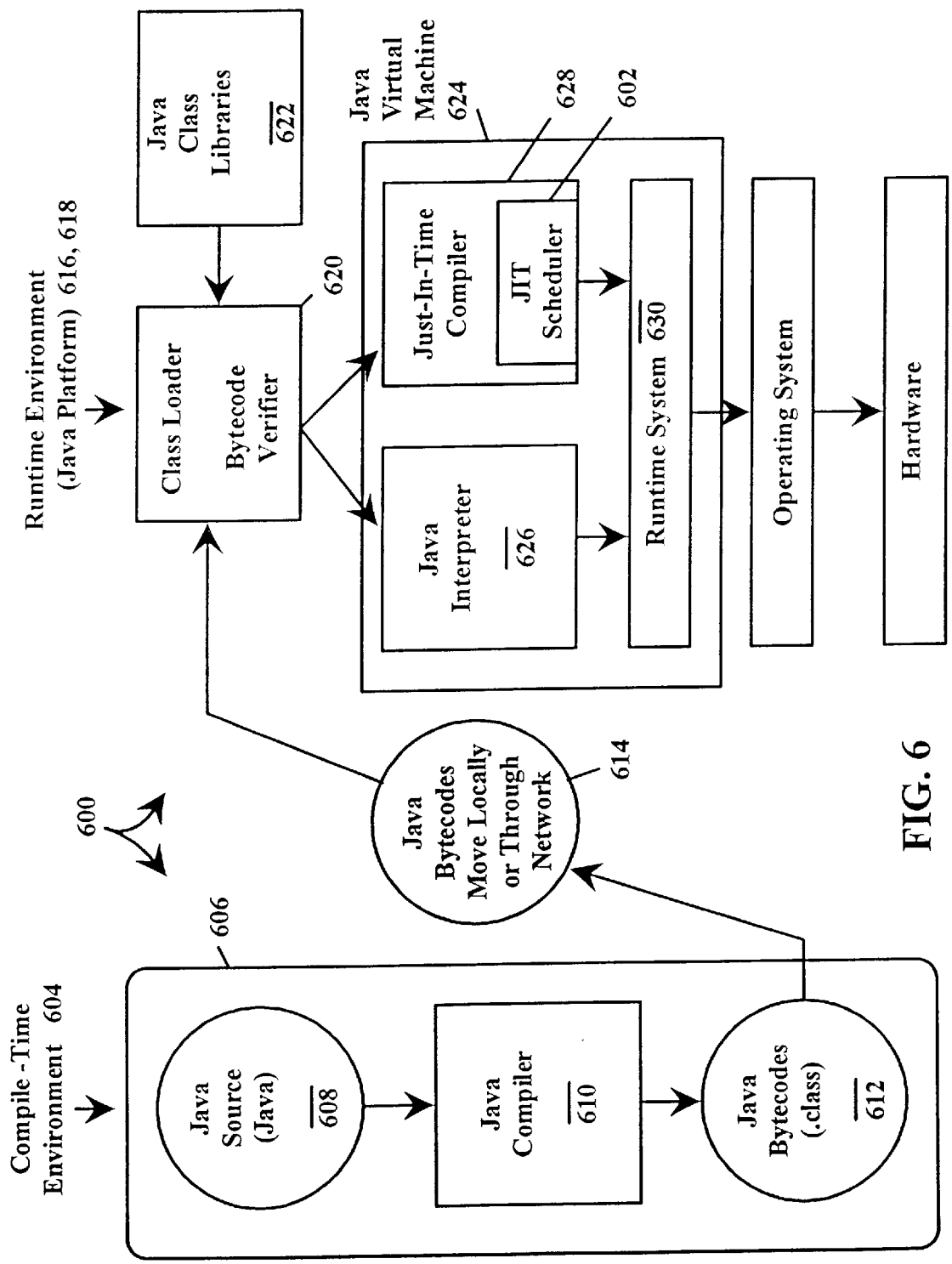
FIG. 6 is a schematic block diagram showing an embodiment of a network system which forms compile and runtime environments for operating a fast JIT scheduler.

Referring to FIG. 6, an embodiment of a network system 600 is shown which forms compile and runtime environments for operating a fast JIT scheduler 602. The compile-time environment 604 includes a server 606 including storage or memory (not shown) and processor (not shown). The server 606 stores a Java™ source 608 and a Java™ compiler 610. The Java™ source 608 is written by a developer who uses the Java™ compiler 610 to compiles the Java™ source 608, generating Java™ bytecodes 612. The Java™ bytecodes 612 are instructions for a Java Virtual Machine 624. To create an applet, the developer stores bytecode files on a HTTP server and adds an <applet code=filename> tag to a Web page which names the entry-point bytecode file.

When an end user visits the Web page, the <applet> tag causes the bytecode files to be transported over the network from the server 606 to the end user's browser in a Java™ platform 616. Generally, the Java™ bytecodes 612 are transferred locally or through a network 614 to a computer system such as the Java™ platform 616. The Java™ platform 616 is represented by the runtime environment 618.

The Java™ platform 616 includes a class loader with a bytecode verifier 620 which operates using Java™ class libraries 622. The Java™ platform 616 also includes the Java Virtual Machine 624 which executes a Java™ interpreter 626 and a Java™ just-in-time (JIT) compiler 628. The fast JIT scheduler 602 executes in conjunction with the Java™ just-in-time (JIT) compiler 628. Once in the Java Virtual Machine 624, the bytecodes are interpreted by the Java™ interpreter 626 or optionally converted into machine code by the just-in-time (JIT) compiler 628. The Java™ interpreter 626 and the Java™ just-in-time (JIT) compiler 628 operate in the context of a runtime system 630 supporting threads, memory and other system resources. Classes that are utilized by the applet are dynamically loaded by the Java™ class libraries 622.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, although the illustrative fast scheduler and operating method are described as applied to a SPARC assembly instruction scheduler, other target processors and processor assembly instruction sets may be supported.

What is claimed is:

1. A fast scheduler for operating on a processor, the fast scheduler comprising:
 a computer usable medium product having computable readable code embodied therein including:
  a routine for acquiring a sliding window including three consecutive instruction from a memory which is coupled to the processor;
  a routine for analyzing the tree-instruction sliding window in two successive examination operations; and
  a routine for applying a plurality of rules to the three instructions within the sliding window to determine when to reorder scheduling of the instructions within the sliding window.

2. A fast scheduler according to claim 1 wherein the routine analyzing a sliding window of three instructions includes:
 a routine a acquiring opcodes and operands of the instruction in the three instruction sliding window; and
 a routine for determining register usage and definition of the operands of the instructions with respect to operands of other instructions within the three instruction sliding window.

3. A fast scheduler according to claim 1 wherein:
 the routine for analyzing the three-instruction sliding window includes:
  a routine for acquiring opcodes and operands of the instruction in the three instruction sliding window; and
  a routine for determining register usage and definition of the operands of the instructions with respect to operands of other instructions within the three instruction sliding window, the instructions including a current instruction, a next instruction, and a last instruction, the routine for determining whether the current instruction defines a register that is used by the next instruction and for determining whether the next instruction defines a register that is used by the last instruction; and
 the routine for applying a plurality of rules includes:
  a routine for applying a first rule in which if the current instruction defines a register that is used in the next instruction and the next instruction does not define a register used in the last instruction, then the next instruction and the last instruction are switched; and
  a routine for applying a second rule in which if the next instruction and the last instruction are switched by application of the first rule, then the sliding window is incremented by two instructions for a next application of the sliding window, and otherwise the sliding window is incremented by one instruction for the next application of the sliding window.

4. A fast scheduler according to claim 1 wherein:
 the routine for analyzing the thee-instruction sliding window performs the sliding window in a single pass through an instruction block.

5. A fast scheduler according to claim 1 wherein:
 the routine for analyzing the three-instruction sliding window performs the sliding window in a plurality of passes through an instruction block.

6. A fast scheduler according to claim 1 wherein:
 the routine for applying a plurality of rules to the three instructions within the sliding window further comprises:
  a routine for preventing switching of instructions including nop and branch instructions.

7. A fast scheduler according to claim 1 wherein:
 the routine for applying a plurality of rules to the three instructions within the sliding window further comprises:
  a routine for preventing switching of instructions in the sliding window when the instructions include a SAVE instruction or a RESTORE instruction.

8. A fast scheduler according to claim 1, wherein:
 the routine for applying a plurality of rules to the three instructions within the sliding window further comprises:
  a routine for preventing switching of instructions in the sliding window when the instructions include a jump and link (JMPL) instruction or a CALL instruction.

9. A fast scheduler according to claim 1 wherein:
 the routine for applying a plurality of rules to the three instructions within the sliding window further comprises:
  a routine for preventing switching of instructions in the sliding window when the switch operation would cause an instruction to bypass a STORE instruction.

10. A fast scheduler according to claim 1 wherein:
 the routine for applying a plurality of rules to the three instructions within the sliding window further comprises:
  a routine for preventing switching of instructions in the sliding window when the switch operation would cause a LOAD instruction to bypass a LOAD instruction.

11. A fast scheduler according to claim 1, wherein:
 the fast scheduler is part of a Java™ just-in-time (JIT) compiler.

12. A fast scheduler according to claim 1, wherein the computer usable medium product includes a computer having computable readable code embodied therein for implementing of the acquiring, analzing, and applying routines thereof.

13. A computer system that executes instructions and prepares for instruction execution by fast scheduling the instructions, the computer system comprising:
 a processor that fast schedules the instructions and executes the scheduled instructions;
 a memory coupled to the processor, the memory including a computable readable code embodied therein for usage by a fast scheduler including:
  code for acquiring a sliding window including three consecutive instruction from the memory;
  code for analyzing the three instructions sliding window in two successive examination operations; and
  code for applying a plurality of rules to the three instructions within the sliding window to determine when to reorder scheduling of the instructions within the sliding window.

14. A method of scheduling instructions for usage in a compiler comprising:
 defining a first instruction pointer, a second instruction pointer, and a third instruction pointer designating a three instruction sliding window and identifying a first instruction, a second instruction, and a third instruction as a consecutive sequence of instructions;
 in the sliding instruction window, determining whether the second instruction is dependent on the first instruction and whether the third instruction is dependent on the second instruction;
 switching the second instruction and the third instruction when the second instruction is dependent on the first instruction and the third instruction is not dependent on the second instruction;
 incrementing by two the first instruction pointer, the second instruction pointer, and the third instruction pointer if the second and third instructions are switched in the switching operation; and
 incrementing by one the first instruction pointer, the second instruction pointer, and the third instruction pointer otherwise.

15. A method according to claim 14, further comprising:
 looping through the determining step, the switching step, and the incrementing steps so long as instructions remain in an instruction block.

16. A method according to claim 14, further comprising:
initializing the first instruction pointer, the second instruction pointer, and the third instruction pointer to sequential initial values having a relative increment of a single instruction length.

17. A method according to claim 14, further comprising:
looping through the instructions in an instruction block in a single-pass.

18. A method according to claim 14, further comprising:
looping through the instructions in an instruction block in a plurality of iterative passes.

19. A method according to claim 14, wherein the operation of determining whether the second instruction is dependent on the first instruction includes:
examining the source operands of the second instruction and the destination operand of the first instruction;
designating a dependence condition when the destination operand of the first instruction is the same as a source operand of the second instruction; and
otherwise designating a non-dependence condition.

20. A method according to claim 14, wherein:
the compiler is a just-in-time (JIT) compiler.

21. A method according to claim 14, wherein:
the compiler is a Java™ just-in-time (JIT) compiler.

22. A fast scheduler according to claim 14, including a computer-usable medium product embodying a computer program having computable readable code embodied therein for implementing execution of the operations of defining, conditional determining switching, incrementing by one and incrementing by two.

23. A computer system that executes instruction and prepares for instruction execution by fast scheduling the instructions, the computer system comprising:
a processor that fast schedules the instructions and executes the scheduled instruction;
a memory coupled to the processor, the memory including a computable readable code embodied therein for usage by a fast scheduler including:
code for defining a first instruction pointer, a second instruction pointer, and a third instruction pointer designating a three instruction sliding window and identifying a first instruction, a second instruction, and a third instruction as a consecutive sequence of instruction;
code operative in the sliding instruction window for determining whether the second instruction is dependent on the first instruction and whether the third instruction is dependent on the second instruction;
code for switching the second instruction and the third instruction when the second instruction is dependent on the first instruction and the third instruction is not dependent on the second instruction;
code for incrementing by two first instruction pointer, the second instruction pointer and the third instruction pointer if the second and third instruction are switched in the switching operation; and
code for incrementing by one the first instruction pointer, the second instruction pointer, and the third instruction pointer otherwise.

24. A method of scheduling instructions for execution in a superscalar processor comprising:
acquiring a sliding window including three consecutive instructions from a memory which is coupled to the processor;
analyzing the sliding window of three instructions in two successive examination operations; and
applying a plurality of rules to the three instructions within the sliding window to determine when to reorder scheduling of the instructions within the sliding window.

25. A method according to claim 24 wherein:
the operation of analyzing a sliding window of three instructions includes:
monitoring opcodes of the instructions within the sliding window;
relatively comparing operands of the instructions in the three instruction window; and
determining register usages and definitions of the operands of the instructions with respect to operands of other instructions within the three instruction window.

26. A method according to claim 24 wherein:
the operation of analyzing a sliding window of three instructions includes:
monitoring the opcodes of the instructions within the sliding window;
relatively comparing the operands of the instructions in the three instruction window; and
determining register usages and definitions of the operands of the instructions with respect to operands of other instructions within the three instruction window, the instructions including a current instruction, a next instruction, and a last instruction, the routine for determining whether the current instruction defines a register that is used by the next instruction and for determining whether the next instruction defines a register that is used by the last instruction; and
the operation of applying a plurality of rules includes:
applying a first rule in which if the current instruction defines a register that is used in the next instruction and the next instruction does not define a register used in the last instruction, then the next instruction and the last instruction are switched; and
applying a second rule in which if the next instruction and the last instruction are switched by application of the first rule, then the sliding window is incremented by two instructions for a next application of the sliding window, and otherwise the sliding window is incremented by one instruction for the next application of the sliding window.

27. A method according to claim 24 wherein:
the operation of analyzing a sliding window of three instructions performs the sliding window in a single pass through an instruction block.

28. A method according to claim 24 wherein:
the operation of analyzing a sliding window of three instructions performs the sliding window in a plurality of passes through an instruction block.

29. A method according to claim 24 wherein:
the operation of applying a plurality of rules to the three instructions within the sliding window further comprises:
preventing switching of instructions including nop and branch instructions.

30. A method according to claim 24 wherein:
the operation of applying a plurality of rules to the three instructions within the sliding window further comprises:
preventing switching of instructions in the sliding window when the instructions include a SAVE instruction or a RESTORE instruction.

31. A method according to claim 24 wherein:
the operation of applying a plurality of rules to the three instructions within the sliding window further comprises:
preventing switching of instructions in the sliding window when the instructions include a jump and link (JMPL) instruction or a CALL instruction.

32. A method according to claim 24 wherein:
the operation of applying a plurality of rules to the three instructions within the sliding window further comprises:
preventing switching of instructions in the sliding window when the switch operation would cause an instruction to bypass a STORE instruction.

33. A method according to claim 24 wherein:
the operation of applying a plurality of rules to the three instructions within the sliding window further comprises:
preventing switching of instructions in the sliding window when the switch operation would cause a LOAD instruction to bypass a LOAD instruction.

34. A method according to claim 24 wherein:
the method is a fast scheduling method as a pan of a Java™ just-in-time (JIT) compiler.

35. A fast scheduler according to claim 24, wherein the computer usable medium product includes a computer program having computable readable code embodied therein for implementing execution of the acquiring, analyzing and applying, routines thereof.

36. A computer system that executes instructions and prepares for instruction execution by fast scheduling the instructions the computer system comprising:
a superscalar processor that fast schedules the instructions and executes the scheduled instructions;
a memory coupled to the superscalar processor, the memory including a computable readable code embodied therein for usage by a fast scheduler including:
code for acquiring a sliding window including three consecutive instructions from the memory;
code for analyzing the three instruction sliding window in two successive examination operation; and
code for applying a plurality of rules to the three instructions within the sliding window to determine when to reorder scheduling of the instructions within the sliding window.

* * * * *